(12) United States Patent
Liu et al.

(10) Patent No.: US 9,142,930 B2
(45) Date of Patent: Sep. 22, 2015

(54) ELECTRIC MOTOR WITH SPARK SUPPRESSION CIRCUIT

(75) Inventors: Bao Ting Liu, Shenzhen (CN); Li Sheng Liu, Shenzhen (CN); Yue Li, Hong Kong (CN); Hong Jian Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 588 days.

(21) Appl. No.: 13/540,282

(22) Filed: Jul. 2, 2012

(65) Prior Publication Data
US 2013/0002088 A1    Jan. 3, 2013

(30) Foreign Application Priority Data

Jun. 30, 2011   (CN) .......................... 2011 1 0185535

(51) Int. Cl.
| | |
|---|---|
| *H02K 13/10* | (2006.01) |
| *H01R 39/06* | (2006.01) |
| *H02K 23/62* | (2006.01) |
| *H02K 13/14* | (2006.01) |
| *H01R 39/46* | (2006.01) |
| *H02K 13/00* | (2006.01) |

(52) U.S. Cl.
CPC .............. *H01R 39/06* (2013.01); *H02K 13/105* (2013.01); *H02K 13/14* (2013.01); *H02K 23/62* (2013.01); *H01R 39/46* (2013.01); *H02K 13/003* (2013.01); *H02K 13/006* (2013.01)

(58) Field of Classification Search
CPC ... H02K 13/00; H02K 13/003; H02K 13/006; H02K 13/105; H02K 13/14
USPC .......... 310/222, 220–221, 232–234, 236–237
See application file for complete search history.

(56) References Cited

U.S. PATENT DOCUMENTS

| | | | | |
|---|---|---|---|---|
| 3,532,949 | A | * | 10/1970 | Frederic et al. ............... 310/222 |
| 3,937,993 | A | | 2/1976 | Noodleman |
| 4,164,785 | A | * | 8/1979 | Young et al. .................. 318/158 |
| 6,396,175 | B2 | | 5/2002 | Fujita et al. |
| 2006/0043817 | A1 | * | 3/2006 | Nagai et al. ................... 310/219 |

FOREIGN PATENT DOCUMENTS

| | | |
|---|---|---|
| CN | 1034099 A | 7/1989 |
| CN | 2781635 Y | 5/2006 |

(Continued)

OTHER PUBLICATIONS

Machine translation of JP2006-074906A (Mar. 2006).*

(Continued)

*Primary Examiner* — Michael Andrews
(74) *Attorney, Agent, or Firm* — Muncy, Geissler, Olds & Lowe, P.C.

(57) ABSTRACT

A brush direct current motor has a first connecting portion and a second connecting portion for respectively connecting the positive and negative electrode of a direct current power source, a stator having a number of coils corresponding to N phases, a rotor, a current converting device and a spark suppression circuit. The spark suppression circuit has N branches. Each branch comprises a first diode and a second diode, the cathode of the first diode and the anode of the second diode are respectively connected to the first connecting portion and the second connecting portion, the anode of the first diode and the cathode of the second diode are connected to a corresponding phase.

14 Claims, 4 Drawing Sheets

(56) References Cited

FOREIGN PATENT DOCUMENTS

| JP | 55125054 | A | * | 9/1980 | ............. | H02K 13/00 |
| JP | 4200259 | A | | 7/1992 | | |
| JP | 2006074906 | A | * | 3/2006 | ............. | H02K 13/00 |
| JP | 2010252614 | A | | 11/2010 | | |

OTHER PUBLICATIONS

Machine translation (abstract) of JP55-125054. (Sep. 1980).*

* cited by examiner

ELECTRIC MOTOR WITH SPARK SUPPRESSION CIRCUIT

CROSS REFERENCE TO RELATED APPLICATIONS

This non-provisional patent application claims priority under 35 U.S.C. §119(a) from Patent Application No. 201110185535.7 filed in The People's Republic of China on Jun. 30, 2011.

FIELD OF THE INVENTION

This invention relates to electric motors and in particular, to a direct current motor having a commutator and a permanent magnet rotor.

BACKGROUND OF THE INVENTION

Direct current electric motors having a permanent magnet rotor, wound stator coils, a commutator and brushes are generally known as shown in Japanese patent publication JP4-200259. The commutator is used to convert the direct current power to alternating current power in a number of phases to supply the stator coils. Suppression of electrical noise is an important issue for such motors as the power of the motor is increased. Chokes are usually employed as noise suppression elements to suppress noise. However, the size of the chokes is often large to achieve acceptable suppression which increases the size of the motor.

The present invention aims to provide a new motor which can solve or at least mitigate the above mentioned problems.

SUMMARY OF THE INVENTION

Accordingly, in one aspect thereof, the present invention provides an electric motor comprising: a stator comprising a plurality of coils that correspond to N phases; a rotor comprising a shaft and P permanent magnet poles; a commutator comprising two conductive slip rings, P bars electrically connected to the slip rings, and an insulating body fixed to the shaft and supporting the slip rings and the bars, wherein the bars are equally spaced along the circumferential direction of the commutator; two first brushes respectively arranged to make sliding electrical contact with the first and second slip rings; N second brushes electrically connected to the N phases and arranged to make sliding electrical contact with the bars; and a spark suppression circuit comprising N branches, wherein each branch comprises a first diode and a second diode, the cathode of the first diode being connected to the first brush that is arranged to be connected to a positive terminal of a DC power source, the anode of the second diode being connected to the first brush that is arranged to be connected to a negative terminal of the DC power source, and the anode of the first diode and the cathode of the second diode being connected together and to a corresponding phase.

Preferably, the motor further comprises P resistors, wherein each resistor is respectively disposed in a gap between adjacent bars and is electrically connected to the adjacent bars and has a contact surface arranged to electrically contact the second brushes when the rotor turns.

Preferably, the resistance of the resistors is more than three times the resistance of the coils of the stator.

Preferably, the commutator comprises a cylindrical brush contact surface that is formed by the slip rings and the bars and extends along the axial direction of the shaft.

Preferably, the commutator has a planar brush contact surface that is formed by the slip rings and the bars and extends in a direction perpendicular to the shaft.

Preferably, the commutator comprises a cylindrical brush contact surface that is formed by the bars and extends along the axial direction of the shaft; and the commutator also comprises two planar brush contact surfaces that are formed by the slip rings and extend in a direction perpendicular to the shaft.

Preferably, the width of each bar in the circumferential direction of the shaft, is substantially equal to the arc length that corresponds to the mechanical angle of the motor less the sum of the width of the second brush and a spacing width.

According to a second aspect, the present invention also provides an electric motor comprising: a stator comprising a plurality of coils that correspond to N phases; a rotor comprising a shaft and P permanent magnet poles; a commutator comprising N slip rings, N bars electrically connected to respective slip rings, and an insulating body fixed to the shaft and supporting the slip rings and the bars, wherein the bars are equally spaced circumferentially of the commutator; two first brushes respectively arranged to make sliding electrical contact with the bars; N second brushes electrically connected to the N phases and arranged to make sliding electrical contact with the slip rings; and a spark suppression circuit comprising N branches, wherein each branch comprises a first diode and a second diode, the cathode of the first diode is connected to the first brush that is arranged to connect to the positive electrode of a DC power source, the anode of the second diode is connected to the first brush that is arranged to connect to the negative electrode of the DC power source, and the anode of the first diode and the cathode of the second diode are connected to a corresponding phase.

According to a further aspect, the present invention also provides an electric motor comprising: a first connecting portion for connecting a positive electrode of a DC power source; a second connecting portion for connecting a negative electrode of the DC power source; a stator comprising a plurality of coils that correspond to N phases; a rotor received in the stator and comprising a plurality of poles; a current converting device electrically connected between the connecting portions and the phases for commutating the direct current supplied from the power source to N phases of alternating current and connecting the N phase currents to respective coils of the stator; and a spark suppression circuit comprising N branches, wherein each branch comprises a first diode and a second diode, the cathode of the first diode and the anode of the second diode being respectively connected to the first connecting portion and the second connecting portion, and the anode of the first diode and the cathode of the second diode being connected to a corresponding phase.

Preferably, the poles of the rotor are radially polarized permanent magnet poles.

In embodiments of the present invention, when a second brush disconnects from a bar, the induced electromotive force generated by the coil that is connected to this disconnected second brush will flow to the power source via the branch of the spark suppression circuit. As such, the induced electromotive force is suppressed, and therefore sparking is also suppressed or even eliminated.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
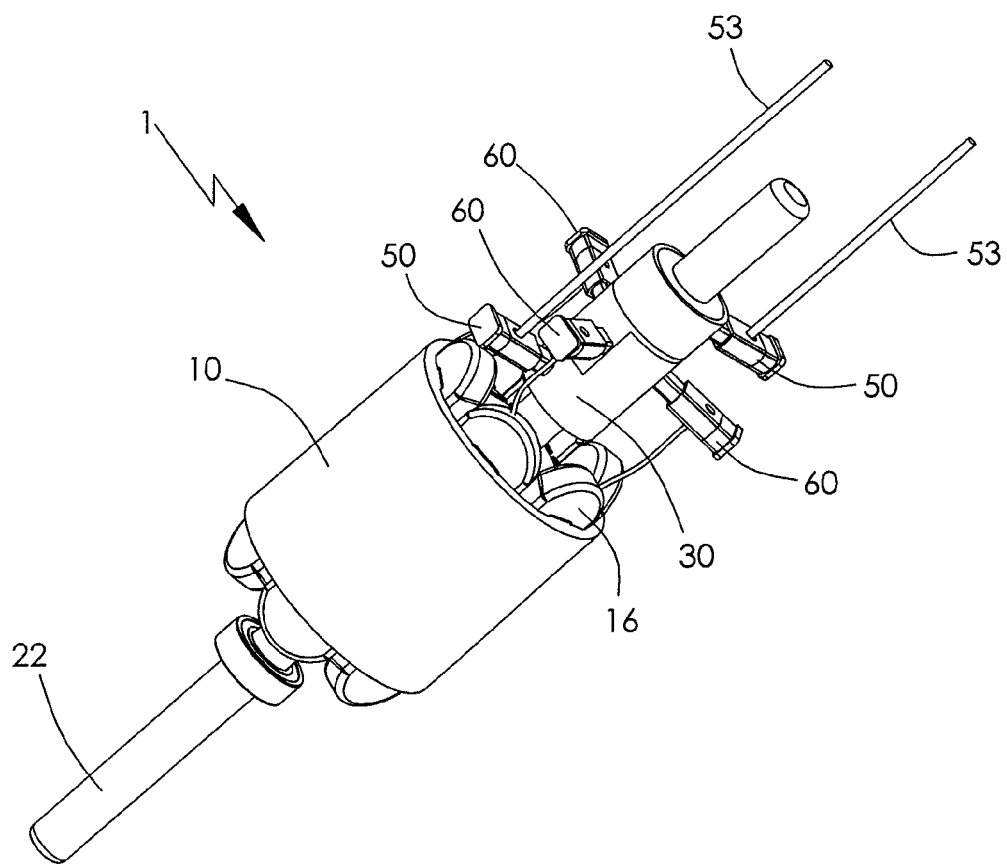
FIG. 1 is a view of a brushed, direct current motor, according to a first embodiment of the present invention, the motor includes a commutator and a number of brushes.
Figure 2:
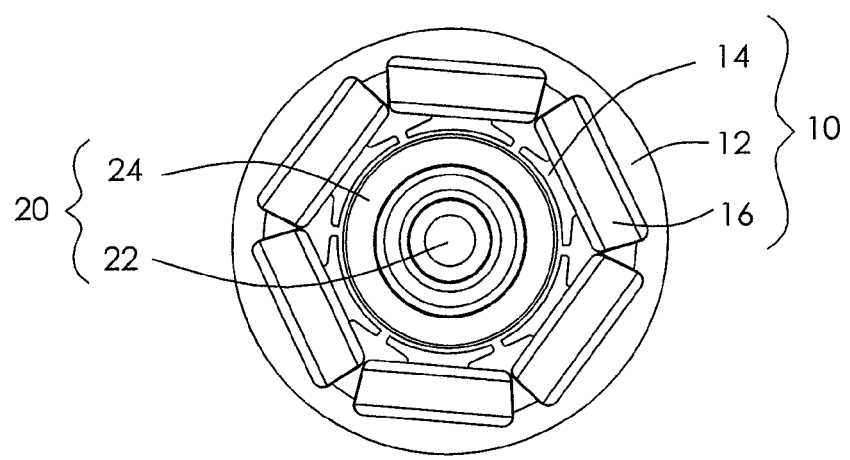
FIG. 2 is an end view of the motor of FIG. 1.
Figure 3:
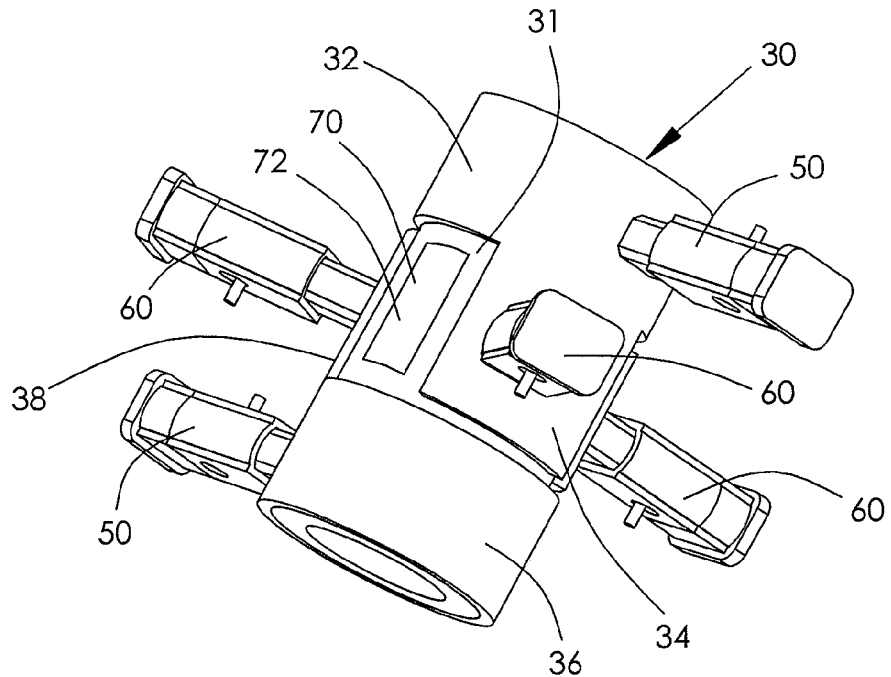
FIG. 3 is a view of the commutator and brushes of the motor of FIG. 1.
Figure 4:
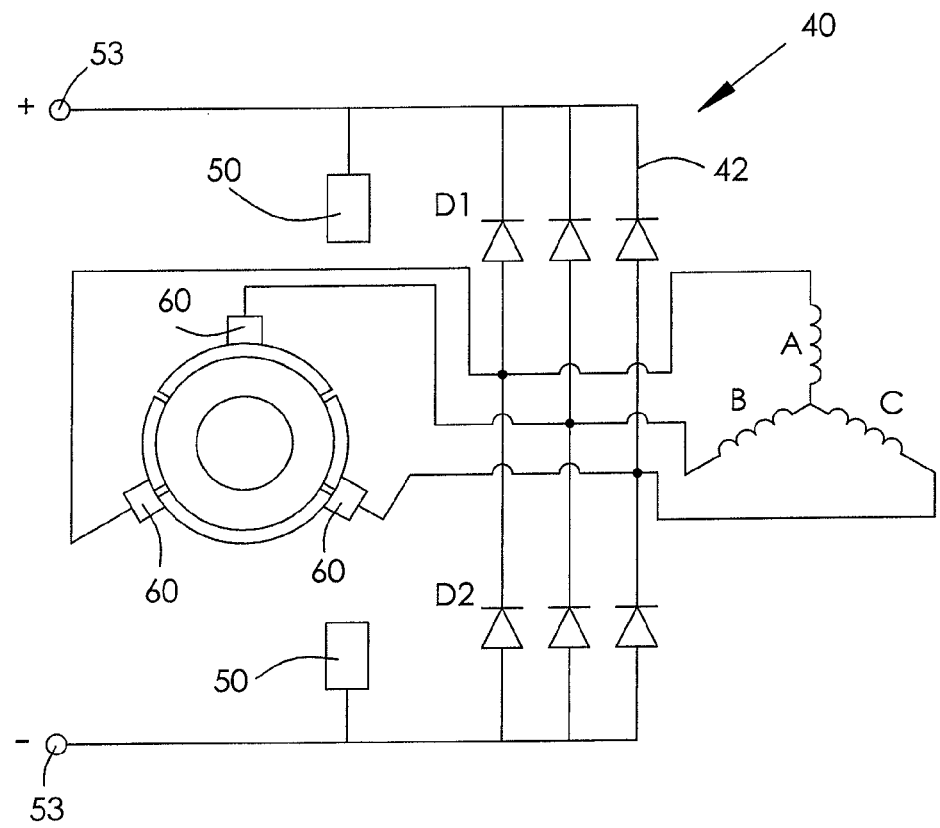
FIG. 4 is an electric circuit diagram of the motor of FIG. 1.

Referring to FIGS. 1 to 4, a brushed, direct current (DC) motor 1, according to the first embodiment of the present invention, includes a stator 10, a rotor 20, a commutator 30, a spark suppression circuit 40, two first brushes 50, and three second brushes 60.

The stator 10 includes a circular yoke 12, six teeth 14, and six coils 16. The teeth 14 equidistantly protrude from the inner surface of the yoke 12. The coils 16 correspond to three phases A, B, C and are wound around corresponding teeth 14, one tooth per coil. The coils 16 are connected in star, which means that a first end of each coil 16 is connected to a respective second brush 60 while the second ends of the coils 16 are connected together. Alternatively, the coils 16 can be connected in delta, which means that each coil 16 is connected between two second brushes 60. Preferably, the coils 16 are made of aluminum wire.

The rotor 20 is arranged inside the stator 10, including a shaft 22 and two poles 24. Preferably, the poles 24 are permanent magnet poles, optionally radially polarized, and are circumferentially, equidistantly fixed to the shaft 22, typically via a rotor core, such that the polarity of the magnetic poles 24 are different, i.e. one pole is a magnetic North and the other pole is a magnetic South. Preferably, the magnetic poles 24 of the rotor 20 are formed by a single ring magnet having two poles of alternating polarity spaced circumferentially about the rotor 20. Alternatively, the rotor may have more than two magnetic poles formed by the ring magnet having a number of poles of alternating polarity spaced circumferentially about the rotor 20.

The commutator 30 is fixed to the shaft 22 and has an insulating body 31 for supporting a number of commutator elements, including a first conductive slip ring 32, a first bar 34, a second conductive slip ring 36, and a second bar 38. The first and second slip rings 32 and 36 are spaced along the shaft 22. The first and second bars 34, 38 axially extend from the first and second slip rings 32, 36 respectively, towards the second and first slip rings 36, 32. Preferably, the first and second bars 34, 38 are integrally formed with the first and second rings 32, 36 respectively as a single piece stamping. The first and second bars 34, 38 are alternately arranged at equally spaced intervals in the circumferential direction of the shaft 22. The first bar 34 is electrically insulated from the second bar 38.

The spark suppression circuit 40 includes three branches 42 that correspond to the three phases A, B, and C. Each branch 42 includes a first diode D1 and a second diode D2. The anode of the first diode D1 and the cathode of the second diode D2 are connected to a corresponding phase. The cathode of the first diode D1 is connected to the first brush 50 that is connected to the positive electrode of a power source. The anode of the second diode D2 is connected to the first brush 50 that is connected to the negative electrode of the power source.

The two first brushes 50 extend radially so as to make continuously sliding contact with the first and second slip rings 32, 36 respectively. The three second brushes 60 are arranged axially between the two first brushes 50. The three second brushes 60 are equally spaced along the circumferential direction of the commutator 30, so as to make sliding contact with the first bar 34 and the second bar 38 as the rotor 20 turns. This means the included angle between adjacent second brushes 60 is 120 degrees.

The width of the first and second bars 34, 38, measured in the circumferential direction of the shaft 22, is almost equal to the arc length that corresponds to the mechanical angle of the motor, less the sum of the width of a second brush 60 and a spacing width that is configured for avoiding power short circuits. The mechanical angle is equal to the electric conduction angle divided by half of the number of magnetic poles 24, and the electric conduction angle is equal to 120 degrees or 180 degrees. The distance between the first bar 34 and the second bar 38 is greater than the width of the second brush 60 to prevent the second brush 60 from simultaneously connecting the first and second bars 34,38. The width of the first or second bar 34,38 is greater than the result of the included angle between adjacent second brushes 60 less the width of the second brush 60, so that the first or second bar 34,38 is able to contact two adjacent second brushes 60 simultaneously.

In operation, DC power from a DC power source (not shown) is transmitted to the coils 16 via power leads 53, the first brushes 50, the commutator 30, and the second brushes 60 in series, so that the coils 16 generate magnetic fields. The force created by these magnetic fields causes the rotor 20 to rotate. During rotation, the DC power is converted by the commutator 30 into three phases of alternating current (AC) power which is supplied to the coils 16, so as to maintain the rotation of the rotor 20. At the moment the second brush 60 disconnects from the first or second bar 34,38, an induced electromotive force will be generated by the coil 16 that is connected to this disconnected second brush 60 due to sharp current change. In this case, the first diode D1 connected to this disconnected second brush 60 will be turned on by the force of the induced electromotive force when current before the disconnection flowed from the connection point of the three phases to the disconnected second brush 60, or the second diode D2 connected to this disconnected second brush 60 will be turned on by the force of the induced electromotive force when current before the disconnection flowed from the disconnected second brush 60 to the connection point of the three phases. As such, part of the induced electromotive force will run to the power source, thereby the induced electromotive force is suppressed, and therefore sparks are also suppressed or even eliminated.

In alternative embodiments, the motor 1 may further includes two resistors 70. Each resistor 70 is electrically connected to the first and second bars 34, 38, preferably via two opposite ends of a surface thereof that face the insulating body 31. The two resistors 70 are arranged along the path of the second brushes 60 and are arranged at the two gaps between the first bar 34 and the second bar 38. Each resistor 70 includes a contacting surface 72 that faces away from the insulating body 31 and is configured for electrically contacting the second brushes 60 when the rotor 20 turns. The distance between the resistor 70 and the first or second bar 34,38 is less than the width of the second brushes 60. As such, during operation, when a second brush 60 disconnects from the first or second bar 34,38, it has already contacted the contacting surface 72 of the resistor 70, which allows part of the induced electromotive force to return to the power source via the resistor 70 and the first or second bar 34,38 in series. Preferably, the resistance of the resistor 70 is more than three times the resistance of the coils 16 of the stator.

In the present embodiments, the motor 1 includes two magnetic poles 24, three phases, and three branches 42 corresponding to the three phases. However, it should be understood that the numbers of magnetic poles and phases are not limited to the present embodiment. For example, the number of phases can be other integers like 2 or 4; the number of magnetic poles can be other even numbers like 4 and 6, as long as the total number of bars of the commutator is equal to the number of poles of the rotor, and that the number of second brushes and the number of branches both are equal to the number of phases, and the second brushes are equally spaced along the circumferential direction of the commutator.

The first and second slip rings 32 and 36, the first and second bars 34 and 38, and the first and second brushes 50 and 60 are used as a current converting device (not labeled) for converting the current supplied from a direct current power source to a number of phases of alternating current in cooperation with the rotation of the rotor, and passing the numbers of phase currents to the coils 16 of the stator 10. However, it should be understood that the commutator and the connection between the commutator and the first and second brush are not limited to the structure of the present embodiment.

Figure 5:
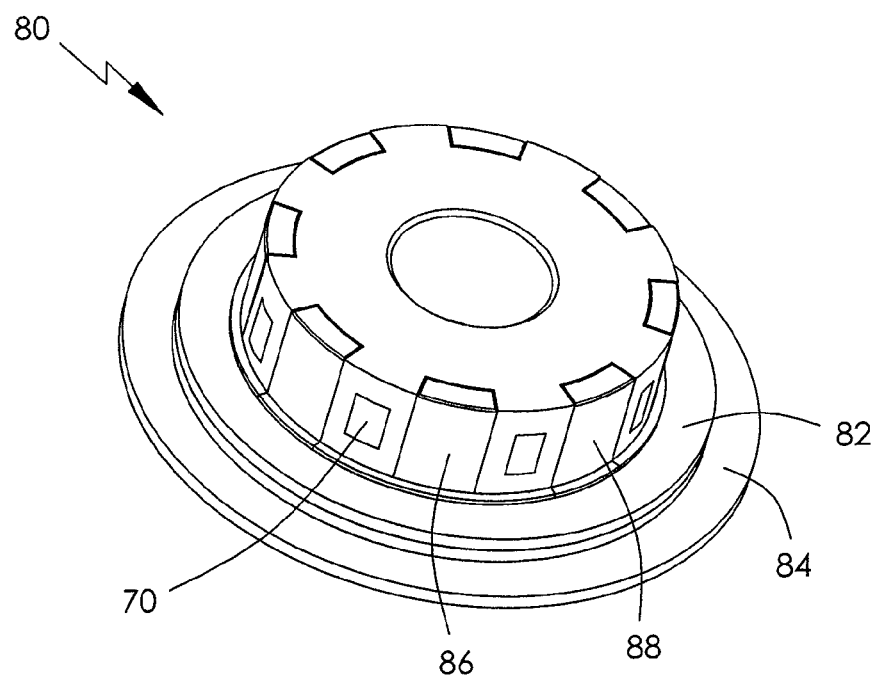
FIG. 5 is a view of an alternative commutator for the motor of FIG. 1, according to a second embodiment of the present invention.

For example, in another embodiment, the motor may use a commutator 80 as shown in FIG. 5. The main difference between this commutator 80 and the commutator 30 described above is that the first and second slip rings 82 and 84 extend radially in respective planes which are generally perpendicular to the axis of the shaft or commutator and are arranged at the same side of the first and second bars 86 and 88. Thus the first brushes (not shown in FIG. 5) would extend axially while the second brushes would extend radially. Resistors 70 are also arranged between adjacent first and second bars 86, 88.

Figure 6:
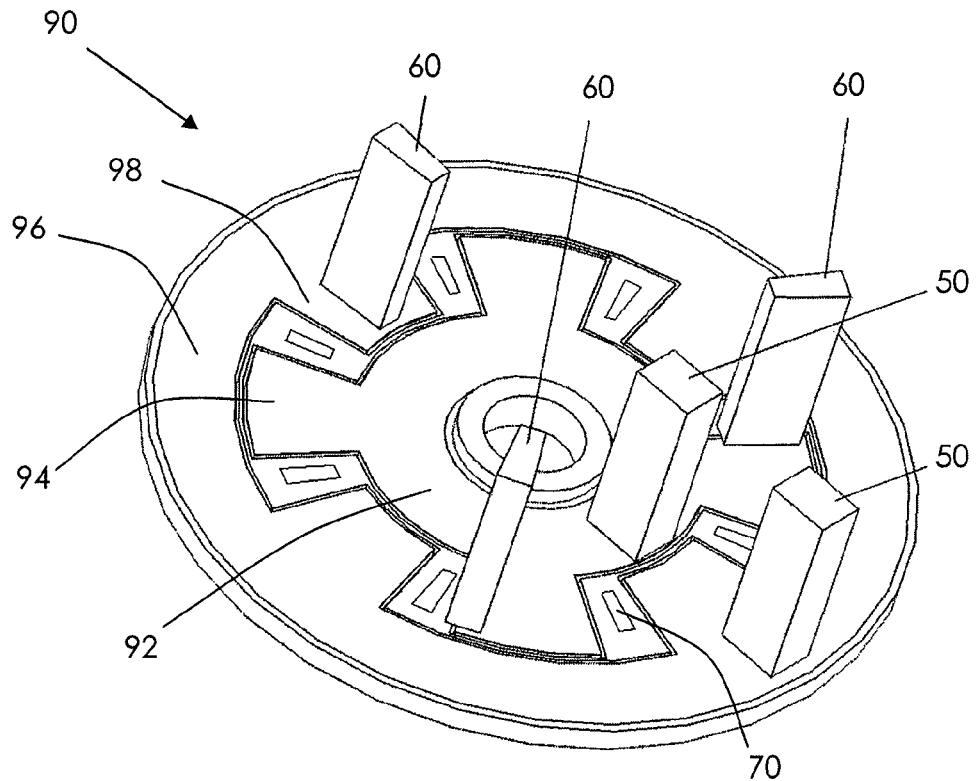
FIG. 6 is a view of another alternative commutator and a number of brushes for the motor of FIG. 1, according to a third embodiment of the present invention.

An example of another commutator 90 for the motor, is shown in FIG. 6. The commutator 90 has a planar contact surface laying in a plane that is perpendicular to the axis of the commutator or shaft. In detail, the commutator has four first bars 94 and four second bars 98 in this example. The first bars 94 extend radially and outwardly from the first slip ring 92. The second slip ring 96 surrounds the first bars 94. The second bars 98 extend radially and inwardly from the second slip ring 96. The first and second bars 94, 98 are alternately arranged at equal intervals in the circumferential direction of the shaft (not shown in FIG. 6) which in use extends through the central opening of the commutator. The first and second brushes 50, 60 extend axially to contact corresponding first and second slip rings 92, 96 and first and second bars 94, 98. Resistors 70 are also arranged between adjacent first and second bars 94, 98.

Figure 7:
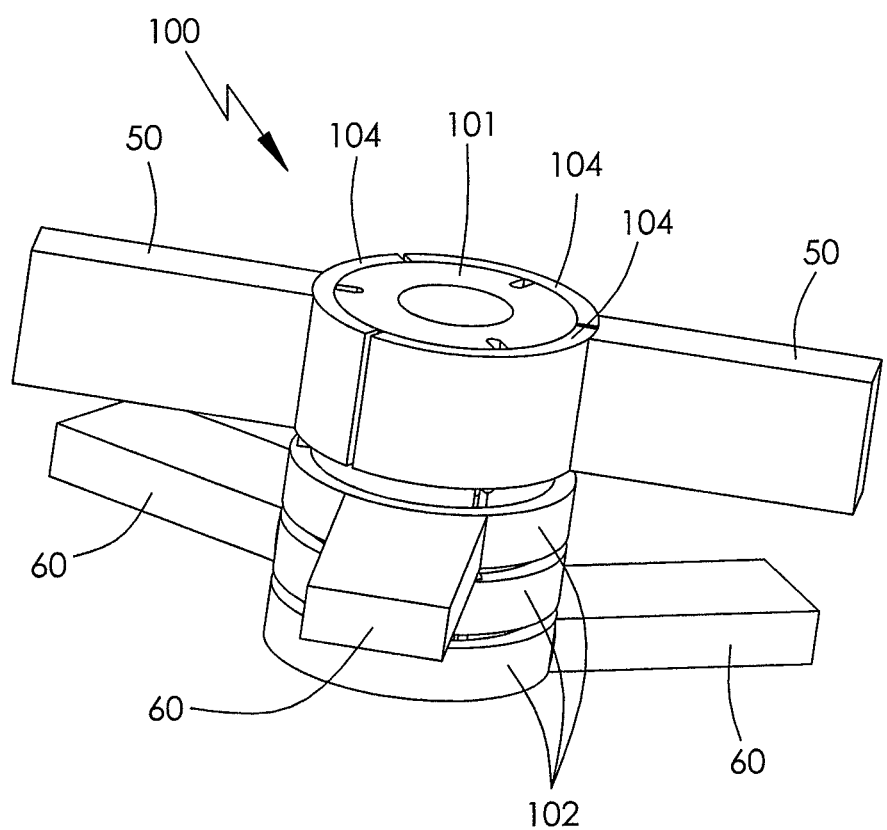
FIG. 7 is a view of a further alternative commutator and a number of brushes for the motor of FIG. 1, according to a fourth embodiment of the present invention.

A further example of a commutator 100 for the motor is shown in FIG. 7. The commutator 100 has three conductive slip rings 102 arranged axially spaced on the insulating body 101 and three commutator bars 104 equidistantly spaced in the circumferential direction and fixed to an end of the body 101. Each slip ring 102 is electrically connected to a corresponding bar 104. Each stator phase is connected to a slip ring 102 via a corresponding second brush 60. The two first brushes 50 are radially arranged to contact the three bars 104 when the commutator 100 rotates, so as to convert current supplied from a direct current power source to a three phase alternating current.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, although the poles of the rotor have been described as radially polarized permanent magnet poles, they may be polarized in other configurations. Indeed, the invention may be used with a switched reluctance motor in which the poles of the rotor are not formed by permanent magnets.

The invention claimed is:

1. An electric motor, comprising:
   a stator comprising a plurality of coils that correspond to N phases;
   a rotor comprising a shaft and P poles;
   a commutator comprising two conductive slip rings, P bars electrically connected to the slip rings, and an insulating body fixed to the shaft and supporting the slip rings and the bars, wherein the bars are equally spaced along the circumferential direction of the commutator;
   two first brushes respectively arranged to make sliding electrical contact with the first and second slip rings;
   N second brushes electrically connected to the N phases and arranged to make sliding electrical contact with the bars; and
   a spark suppression circuit comprising N branches, wherein each branch comprises a first diode and a second diode, the cathode of the first diode being directly connected to the first brush that is arranged to be connected to a positive terminal of a direct current power source, the anode of the second diode being directly connected to the first brush that is arranged to be connected to a negative terminal of the direct current power source, and the anode of the first diode and the cathode of the second diode being connected together and to a corresponding phase.

2. The motor of claim 1 further comprising P resistors, wherein each resistor is respectively disposed in a gap between adjacent bars and is electrically connected to the adjacent bars and has a contact surface arranged to electrically contact the second brushes when the rotor turns.

3. The motor of claim 2, wherein the resistance of the resistors is more than three times the resistance of the coils of the stator.

4. The motor of claim 1, wherein the commutator comprises a cylindrical brush contact surface that is formed by the slip rings and the bars and extends along the axial direction of the shaft.

5. The motor of claim 1, wherein the commutator has a planar brush contact surface that is formed by the slip rings and the bars and extends in a direction perpendicular to the shaft.

6. The motor of claim 1, wherein the commutator comprises a cylindrical brush contact surface that is formed by the bars and extends along the axial direction of the shaft; and the commutator also comprises two planar brush contact surfaces that are formed by the slip rings and extend in a direction perpendicular to the shaft.

7. The motor of claim 1, wherein the poles of the rotor are radially polarized permanent magnet poles.

8. An electric motor, comprising:
a stator comprising a plurality of coils that correspond to N phases;
a rotor comprising a shaft and P permanent magnet poles;
a commutator comprising N slip rings, N bars electrically connected to respective slip rings, and an insulating body fixed to the shaft and supporting the slip rings and the bars, wherein the bars are equally spaced circumferentially of the commutator;
two first brushes respectively arranged to make sliding electrical contact with the bars;
N second brushes electrically connected to the N phases and arranged to make sliding electrical contact with the slip rings; and
a spark suppression circuit comprising N branches, wherein each branch comprises a first diode and a second diode, the cathode of the first diode is directly connected to the first brush that is arranged to connect to the positive electrode of a DC power source, the anode of the second diode is directly connected to the first brush that is arranged to connect to the negative electrode of the DC power source, and the anode of the first diode and the cathode of the second diode are connected to a corresponding phase.

9. The motor of claim 8, further comprising P resistors, wherein each resistor is respectively disposed in a gap between adjacent bars and is electrically connected to the adjacent bars and has a contact surface arranged to electrically contact the second brushes when the rotor turns.

10. The motor of claim 9, wherein the resistance of the resistors is more than three times the resistance of the coils of the stator.

11. An electric motor, comprising:
a first connecting portion for connecting a positive electrode of a direct current power source;
a second connecting portion for connecting a negative electrode of the power source;
a stator comprising a plurality of coils that correspond to N phases;
a rotor received in the stator and comprising a plurality of poles;
a current converting device electrically connected between the connecting portions and the phases for commutating the direct current supplied from the power source to N phases of alternating current and connecting the N phase currents to respective coils of the stator; and
a spark suppression circuit comprising N branches, wherein each branch comprises a first diode and a second diode, the cathode of the first diode and the anode of the second diode being respectively directly connected to the first connecting portion and the second connecting portion, and the anode of the first diode and the cathode of the second diode being connected to a corresponding phase.

12. The motor of claim 11, wherein the poles of the rotor are radially polarized permanent magnet poles.

13. The motor of claim 11, further comprising P resistors, wherein each resistor is respectively disposed in a gap defined in the current converting device and has a contact surface arranged to electrically contact one of the first connection portion and the second connection portion when the rotor runs.

14. The motor of claim 13, wherein the resistance of the resistors is more than three times the resistance of the coils of the stator.

* * * * *